UNITED STATES PATENT OFFICE.

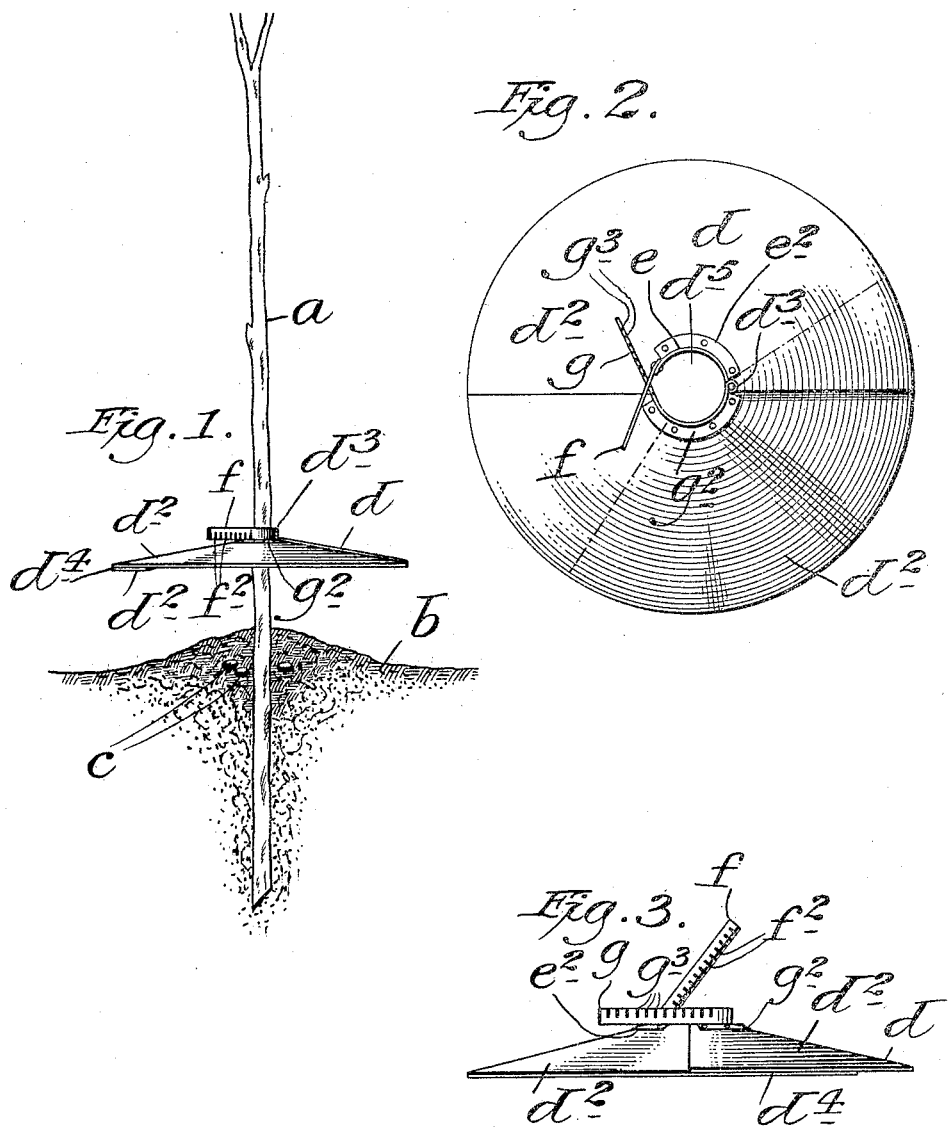

JOHN MARTIN, OF IRVINGTON, NEW YORK.

PLANT-SHIELD.

No. 897,760.

Specification of Letters Patent.

Patented Sept. 1, 1908.

Application filed April 27, 1908. Serial No. 429,358.

*To all whom it may concern:*

Be it known that I, JOHN MARTIN, a citizen of the United States, and residing at Irvington-on-Hudson, in the county of Westchester and State of New York, have invented certain new and useful Improvements in Plant-Shields, of which the following is a specification, such as will enable those skilled in the art to which it appertains to make and use the same.

This invention relates to plant shields for use by gardeners, and the object thereof is to provide a device of this class particularly designed for use as a protection for Lima beans between the time of planting and the appearance thereof above the ground and the formation of leaves.

It is a well known fact that Lima beans or the sprouts therefrom are easily and frequently destroyed by rain during this period, and in fact a single shower will do this, and my invention is intended to protect Lima beans from rain during said period.

The invention is fully disclosed in the following specification, of which the accompanying drawing forms a part, in which the separate parts of my improvement are designated by suitable reference characters in each of the views, and in which:—

Figure 1 is a view showing my improved plant shield applied to a bean pole, and the method of using said shield, Fig. 2 a plan view of the shield detached and showing the same on a larger scale than that shown in Fig. 1, and;—Fig. 3 a side view of the shield as shown in Fig. 2.

In the drawing forming part of this specification, I have shown at $a$ an ordinary bean pole which is stuck into the ground $b$ in the usual manner, and I have also indicated at $c$ the planted beans.

In the practice of my invention I provide a shield $d$, which in the construction shown is circular in form, but which may be octagonal, angular or of any desired shape. The shield $d$ is composed, in the form of construction shown, of two separate pieces $d^2$ of sheet metal pivoted together at $d^3$ and the edges of which overlap as shown at $d^4$. The separate parts of the shield are provided at their pivotal connection $d^3$ and centrally of the shield with segmental recesses forming a central opening $d^5$, the walls of which are adapted to fit around the pole $a$, and in practice the separate parts of the shield are opened at one side by swinging them on their pivotal connection so that the pole $a$ may be passed into the opening $d^5$, after which the separate parts of the shield are swung into the closed position as shown in the drawing. One part of the shield is provided around the opening $d^5$, in the form of construction shown, with a segmental collar $e$ having an angular flange $e^2$ to which is pivoted a flexible arm $f$ having notches or recesses $f^2$ in its bottom edge, and secured to the other part of the shield is a flexible arm $g$ having an angular flange $g^2$, and the arm $g$ is provided in its upper edge with notches or recesses $g^3$, and in the form of construction shown, one end of the arm $g$ is also connected with the pivotal pin at $d^3$.

When the shield has been put on the bean pole $a$ as shown in Fig. 1 the arms $f$ and $g$ are drawn together and interlocked, and this causes the shield to securely grasp the pole $a$ and remain in the desired position thereon. My invention however, is not limited to the particular means herein shown and described for securing the shield to the pole, and any suitable device or devices may be employed for that purpose.

In practice, after the beans have been planted, the shield is connected with the pole at a point from six to ten inches above the ground and is allowed to remain in that position until the beans have appeared above the ground and leaves have formed thereon, after which the shield may be removed as the danger of destruction by rain is over.

It will be understood that my improved shield may be used for protecting other plants as well as beans, whenever desired, and while I have described the shield as composed of sheet metal, it will be apparent that other material may be employed, and various changes in and modifications of the construction described may be made, within the scope of the appended claim, without departing from the spirit of my invention or sacrificing its advantages.

Having fully described my invention, what I claim as new and desire to secure by Letters Patent, is:—

A plant shield composed of separate parts pivotally connected and adapted to rotate one upon another and to be opened at one side and the edges of which are adapted to overlap when closed, said shield when the separate parts are closed together being provided with a central opening, and means for
5 locking the parts together and securing the shield to a pole.

In testimony that I claim the foregoing as my invention I have signed my name in presence of the subscribing witnesses this 23rd day of April 1908.

JOHN MARTIN.

Witnesses:
    JOHN R. FARIEL,
    MICHAEL DINAN.